United States Patent Office 3,514,303
Patented May 26, 1970

3,514,303
PRODUCTION OF ZIRCONIUM
SILICATE PIGMENTS
Eugen Meyer-Simon, Herbert Mann, and Geert Gnutzmann, Frankfurt am Main, and Horst Low, Eschborn, Taunus, Germany, assignors to Deutsche Gold- und Silber-Scheideanstalt vormals Roessler, Frankfurt am Main, Germany
No Drawing. Filed Mar. 13, 1967, Ser. No. 622,451
Claims priority, application Germany, Mar. 12, 1966, D 49,581
Int. Cl. C09c 1/00
U.S. Cl. 106—299       4 Claims

ABSTRACT OF THE DISCLOSURE

Process of producing zirconium silicate pigments comprising heating a mixture of sodium-zirconium silicate with an ammonium salt and a color imparting metal compound to temperatures of 750 to 1300° C. and washing out the sodium released thereby.

BACKGROUND OF THE INVENTION

The present invention relates to an improved process for the production of zirconium silicate pigments.

Ceramic pigments based on zirconium silicate with color imparting elements incorporated therein are highly thought of for use in coloring glazes, coatings produced from ceramic materials and fluxes and ceramic or plastic masses, as well as for the production of underglaze colors.

These zirconium silicate pigments are stable in lead free zirconium containing glazes at temperatures up to 1250° C.

They usually are obtained by calcining a mixture containing the following components:

(1) Zirconium oxide or zirconium oxide forming compounds, such as, zirconium oxychloride, zirconium sulfates and zirconium oxide hydrates.

(2) Silica ($SiO_2$)

(3) Color imparting compounds of the transition metals which, for example, contain one of the elements vanadium, praseodymium, iron, chromium, nickel or cobalt.

(4) Alkali metal halides, mostly, fluorides and chlorides of sodium, as mineralizer (reaction promoting addition).

In order to obtain the zirconium compound, especially, zirconium oxide, it is in most instances usual to use the naturally occurring zircon sand (zirconium silicate, $ZrSiO_4$) as starting material and convert it to sodium-zirconium silicate ($Na_2ZrSiO_5$) by calcining or melting with soda, NaOH or $Na_2O$ or by a hydrothermal treatment with aqueous NaOH and to treat the sodium-zirconium silicate with an acid to separate off the silica and alkali metal components, and to produce zirconium oxide required for the pigment production from the zirconium compound thus separated, preferably, basic zirconium sulfate by calcination.

It also is known that only the sodium component may be removed from the sodium-zirconium silicates by a special procedure using acids. The resulting zirconium oxide-silica mixture obtained which is relatively difficult to process must be washed out. The thus obtained products are then calcined after addition of the color imparting metal compounds and a mineralizer in order to produce the desired zirconium silicate pigments.

It furthermore is known that a zirconium oxide-silica intermediate product produced by a dry reaction between sodium-zirconium silicate and ammonia salts and washing out the sodium salts as described in U.S. Pat. 3,300,414 can be employed for the production of pigments.

All of these processes have the disadvantage that multi-step processes are required for the production of the products containing the zirconium component and above all that the production involves wet methods. As products which are difficult to process are concerned, the wet methods require relatively high plant investments and relatively long processing times.

SUMMARY OF THE INVENTION

According to the invention it was unexpectedly found that zirconium silicate pigments can be produced in an especially simple manner in a single step process by heating a mixture of sodium-zirconium silicate with an ammonium salt and an addition of a color imparting metal compound to temperatures of 750 to 1300° C.

DETAILED DESCRIPTION OF THE INVENTION INCLUDING PREFERRED EMBODIMENTS

The process according to the invention does not require use of wet methods up to the formation of the pigment. The desired pigment is produced by a direct reaction of the sodium-zirconium silicate, which is producible by dry methods, during which the color imparting metal component enters the zirconium silicate crystal lattice as the sodium is released.

It is surprising that this direct reaction with sodium-zirconium silicate is possible as it was known that such a reaction was not possible with zirconium silicate. For instance, ammonium sulfates, ammonium chloride or ammonium fluoride can be used as the ammonium salt employed according to the invention. It is not necessary to add a mineralizer to the mixture which is to be reacted. It is only necessary to wash out the alkali metal compounds after the reaction is completed. The quantity of ammonium salt employed should be at least equivalent to the sodium content of the sodium-zirconium silicate. Any possible excess of ammonium salt is of no consequence as zirconium sulfate or halide are not stable in the reaction product at the temperature employed.

The pigments obtained by the reaction according to the invention in some instances are marked by their special color intensity.

If desired, an alkaline earth metal halide or a lead compound can also be added to the sodium-zirconium silicate, ammonium compound and color imparting metal compound mixture reacted according to the invention. Such addition, in some instances, is a measure which will effect a reduction in the reaction temperaturer or favorably influence the color intensity of the pigment produced.

The following examples will serve to illustrate the process according to the invention.

Example 1

245 g. of sodium-zirconium silicate, 132 g. of ammonium sulfate and 8 g. of vanadium pentoxide were intimately mixed and calcined at 1050° C. The product thus obtained was ground with water in a ball mill, washed sulfate free and dried. The blue pigment thus obtained had a more intensive coloration than zirconium silicate vanadium pigments produced by other methods.

Further examples of pigments produced according to the invention are prescribed in tabulated form. (The proportions given therein are in parts by weight.)

| Example | 2 | 3 | 4 | 5 | 6 | 7 | 8 |
|---|---|---|---|---|---|---|---|
| Sodium-zirconium silicate (23.3% Na2O) (produced by hydrothermal treatment of ZrSiO4 with aqueous NaOH under pressure) | | | | | 100.0 | | |
| Sodium-zirconium-silicate (25% Na2O) (produced by sintering 1.3 mol Na2CO3 with 1 mol ZrSiO4) | 100.0 | 100.0 | 100.0 | 100.0 | | 100.0 | 100.0 |
| Ammonium hydrogen sulfate | 67.5 | | | | | | |
| Ammonium sulfate | | 63.93 | 76.00 | 76.00 | 42.75 | 63.93 | 63.93 |
| Ammonium chloride | | | | | 3.86 | | |
| Ammonium metavanadate | 3.61 | 3.93 | 3.93 | 3.93 | | | |
| Iron oxide | | | | | | | 9.1 |
| Praseodymium oxide | | | | | 2.73 | 2.68 | |
| Nickel oxide | | | | 2.05 | | | |
| Bismuth oxide | | | 7.5 | | | | |
| Lead oxide | | | | | | 7.5 | |
| Calcining temperature, °C | 850 | 1,050 | 1,050 | 1,250 | 1,050 | 1,050 | 1,150 |
| Appearance in glaze | Very blue. | Strong blue. | Greenish blue. | Bluish green. | Strong yellow. | Very strong yellow. | Pinkish brown. |

We claim:

1. In a process for the production of a zirconium silicate based pigment having an oxide of a color imparting transition metal selected from the group consisting of vanadium, praeseodymium, iron, chromium, nickel and cobalt incorporated therein, the step of heating an amount of a dry mixture of sodium-zirconium silicate with an ammonium salt selected from the group consisting of ammonium sulfates, ammonium chloride and ammonium fluoride which is at least stoichiometric with respect to the sodium content of the sodium-zirconium silicate, and a compound of said color imparting transition metal to a temperature between 750 to 1,300° C., said compound of the color imparting metal being capable of providing its oxide during the heat treatment.

2. A process according to claim 1 wherein the compound of the color imparting transition metal is selected from the group consisting of vanadium pentoxide, ammonium metavanadate, iron oxide, praeseodymium oxide and nickel oxide.

3. A process according to claim 1 wherein the transition metal is vanadium.

4. The process of claim 1 in which the mixture heated also contains a small quantity of a mineralizer.

References Cited

UNITED STATES PATENTS

| | | | |
|---|---|---|---|
| 2,441,447 | 5/1948 | Seabright | 106—299 |
| 3,012,898 | 12/1961 | Seabright | 106—299 |
| 3,025,178 | 3/1962 | Seabright | 106—299 |
| 3,300,414 | 1/1967 | Meyer-Simon et al. | 106—299 XR |
| 3,389,005 | 6/1968 | Kloepfer et al. | 106—299 |

FOREIGN PATENTS 1,168,316  4/1964  Germany.

TOBIAS E. LEVOW, Primary Examiner

H. M. S. SNEED, Assistant Examiner